UNSHARP MASK IN ELECTRONIC COLOR CORRECTION

Filed March 10, 1948 2 SHEETS—SHEET 1

INVENTOR.
VINCENT C. HALL
BY
Campbell, Brumbaugh & Free
HIS ATTORNEYS.

INVENTOR.
VINCENT C. HALL
BY
Campbell, Brumbaugh & Free
HIS ATTORNEYS.

Patented Aug. 5, 1952

2,606,245

UNITED STATES PATENT OFFICE 2,606,245

UNSHARP MASK IN ELECTRONIC COLOR CORRECTION

Vincent C. Hall, Stamford, Conn., assignor to Time, Incorporated, New York, N. Y., a corporation of New York Application March 10, 1948, Serial No. 14,007

12 Claims. (Cl. 178—5.2)

The present invention relates to electronic color correstion systems and more particularly to new and improved systems of this character in which a technique known as "unsharp masking" is employed to effect color correction.

Color correction by masking is a well known procedure in color photography. It comprises essentially superimposing, in register, a high or normal contrast separation negative and a low contrast positive. Electro-optical systems embodying means for incorporating the masking procedure in making color separation negatives are also well known in the art.

It has been discovered that by using an "unsharp" mask, i. e., one lacking in fine detail to some extent, a marked improvement in the degree of color correction achieved results. In particular, the degree of register required is not so close as where extremely sharp masks are used. This is of no importance where the masking is accomplished electronically. However, in both mechanical and electronic masking systems, the use of "unsharp" masking results in considerable improvement in contrast in areas of fine detail. The advantages of using an "unsharp" mask to provide color correction are discussed in an article by J. A. C. Yule (Phot. Soc. of Am. Journal, March 1945) and references to previous work in this field are given.

The object of the present invention is to provide new and improved electro-optical color correction systems in which the advantages of "unsharp" masking are obtained.

Another object of the invention is to provide new and improved electronic color correction systems of the above character in which electric signals are produced which represent variations in one color of a subject being scanned and are modified by other electric signals representing an unsharp mask of another color in the subject.

According to the invention, a subject in color is scanned by two different scanning apertures, one of which is larger than the other so as to lose fine detail to the extent required to give the desired degree of unsharpness. Where the term "scanning aperture" is used herein, it is intended to mean the area of the colored original that is actually viewed by the scanning mechanism at any instant. Both of the beams corresponding to the two scanning apertures are split into a number of color components as desired and electric signals corresponding thereto are produced, any suitable apparatus being used for this purpose. The electric signals corresponding to the smaller scanning area are then modified by the signals from the larger scanning area, according to known laws, to produce separation negatives embodying masking color corrections.

According to the invention two scanning apertures of relatively small and relatively large area, respectively, are provided. The two scanning apertures are spaced apart any suitable distance along the scanning line and each aperture has a separate beam splitting and electric signal producing system. Signal delaying means are provided in this embodiment for eliminating phase differences between the two sets of signals produced by the two systems, resulting from the spacing between the two scanning apertures.

Scanning at two different positions spaced apart along the scanning line may also be accomplished by using a single scanning aperture of relatively large area in conjunction with masking means for obtaining from the single scanning aperture two beams representing, effectively, two scanning apertures of different sizes.

Additional objects and advantages of the invention will be apparent from the following detailed description of several typical embodiments, taken in conjunction with the accompanying drawings, in which.

Figure 1:
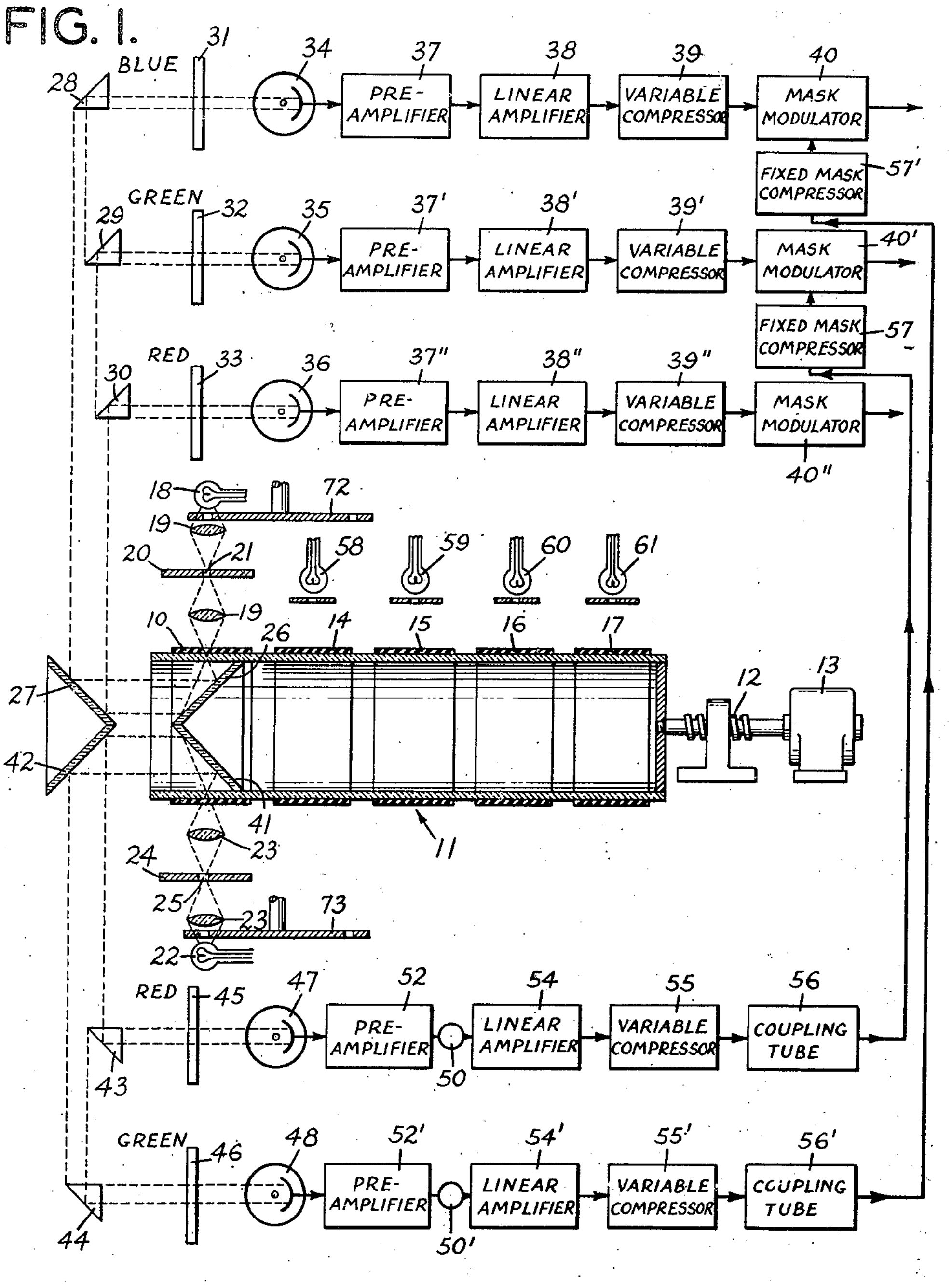
Figure 1 is a schematic diagram of a portion of an electronic color control system constructed according to the present invention.

In the system illustrated in Figure 1, the subject 10 to be scanned (a Kodachrome transparency, for example) is shown mounted on a transparent scanning drum 11 which is adapted to be advanced both longitudinally and in rotation by any suitable means such as a conventional lead screw 12 driven by a motor 13. The scanning drum 11 may be made of sufficient length to accommodate four separation negatives 14, 15, 16 and 17 to be made by means of the electronic color correction system shown, or the negatives may be mounted on separate scanning drums driven in synchronism with the scanning drum 11.

In accordance with the invention, the color transparency 10 is scanned at two different positions along the scanning line by two scanning apertures, one of which is larger than the other. Thus, light interrupted periodically by a suitable light chopper 72 is directed from a suitable source 18 through a lens system 19 upon the transparency 10. Associated with the lens system 19 is an opaque diaphragm 20 having a relatively small aperture 21 therein through which light can pass. In a representative scanning system, the aperture 21 might be made square in shape and its dimensions might be selected to correspond to a scanning aperture approximately .004 inch on a side for a system scanning 250 lines per inch. As stated, the scanning aperture is the actual area of the original 10 that is viewed by the scanning system at any instant.

Spaced apart from the light source 18 along the scanning line is a second light source 22 which directs light interrupted periodically by a second light chopper 73 through a lens system 23 to another point on the transparency 10 located a given distance away along the scanning line from the light focused on the transparency 10 by the source 18. Although the two scanning points on the transparency 10 are shown 180° apart in Figure 1 by way of illustration, obviously they may be located any suitable distance apart.

Associated with the lens system 23 is an opaque diaphragm 24 having an aperture 25 formed therein. The aperture 25 may be either square or circular in cross-section and its size may be selected to correspond to a scanning aperture approximately .008'' by .008'' if square, or .008'' in diameter, if circular, for example. The aperture 25 provides a beam for producing an unsharp masking signal to be employed in an electronic color correction system, as described in greater detail below.

The beam of light transmitted through the transparency 10 from the lens system 19 may be directed by a reflector 26 to another reflector 27 providing a beam which is split up into a plurality of components in any suitable manner as by the prisms 28, 29 and 30, for example. The three beams formed by the prisms 28, 29 and 30 are transmitted through blue, green and red filters 31, 32 and 33, respectively, and the filtered light is directed to suitable photosensitive devices 34, 35 and 36, respectively.

The output of the photosensitive device 34 is fed to one channel of a conventional electronic color correction system which may include a preamplifier 37, a linear amplifier 38, a variable compressor 39 and a mask modulator 40. The outputs of the photosensitive devices 35 and 36 are fed to similar channels, and corresponding elements thereof are designated by primed and double-primed reference characters, respectively.

In similar fashion, the beam of light transmitted through the transparency 10 from the lens system 23 may be directed by the reflectors 41 and 42 to any suitable beam splitter such as the prisms 43 and 44, for example. The two beams formed by the prisms 43 and 44 are transmitted through red and green filters 45 and 46, respectively, and impinge upon photoelectric cells 47 and 48, respectively.

Since the two scanning beams from the light sources 18 and 22, respectively, are spaced apart along the scanning line, the electric signals corresponding thereto must be adjusted to bring them in phase before they are combined in the electronic masking operation. The phase adjustment may be accomplished by delaying the signal which is picked up first until the second beam falls upon the same spot on the transparency 10. Any suitable delaying device may be used for this purpose such as, for example, the apparatus shown in Figure 2.

Figure 2:
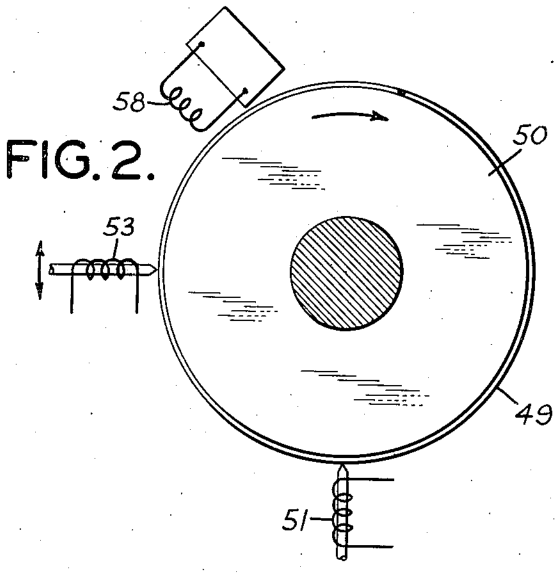
Figure 2 illustrates schematically a form of signal delaying device for use with the system shown in Figure 1.

The delay device shown in Figure 2 may comprise a wire or tape 49 made of magnetic material mounted on a drum 50 driven either by the same shaft which drives the scanning drum 11, or driven in synchronism therewith. The wire 49 is adapted to be magnetized by a coil 51 connected to the output of the preamplifier 52 (Figure 1). Spaced apart from the energizing coil 51 an angular distance equivalent to the angular spacing between the two beams impinging upon the scanning cylinder 11 is a pick-up coil 53. The pick-up coil 53 is preferably made adjustable in position with respect to the energizing coil 51 so that a range of different delay times can be accommodated. A suitable erasing coil 58 may be mounted adjacent the wire 49 for the purpose of erasing the signal thereon after it has passed the pick-up coil 53.

The output of the pick-up coil 53 may be supplied to a linear amplifier 54, compressed in a variable compressor 55 and fed by means of a suitable coupling tube 56 to a fixed mask compressor 57. The mask compressor 57 supplies an output to the green mask modulator 40', in such fashion as to produce an electrical output therefrom corresponding to the modification of the green signal by an unsharp mask of the red.

In similar fashion, the output of the photosensitive device 48 (Figure 1) may be fed to a preamplifier 52', the output of which may be delayed by a wire drum mechanism 50' like the wire drum 50, and amplified in a linear amplifier 54'. The output of the amplifier 54' may be compressed in a suitable variable compressor 55' and fed through a coupling tube 56' to a fixed mask compressor 57' which supplies an output to the mask modulator 40 in the blue channel. It will be understood, therefore, that the output of the modulator 40 will be a blue signal modified by the equivalent of an unsharp mask of the green signal.

The outputs of the mask modulators in the three color channels may be fed through conventional color correction circuits (not shown) to provide signals for actuating the glow lamps 58, 59, 60 and 61 which expose the four color separation negatives 14, 15, 16 and 17, in the usual manner.

Figure 3:
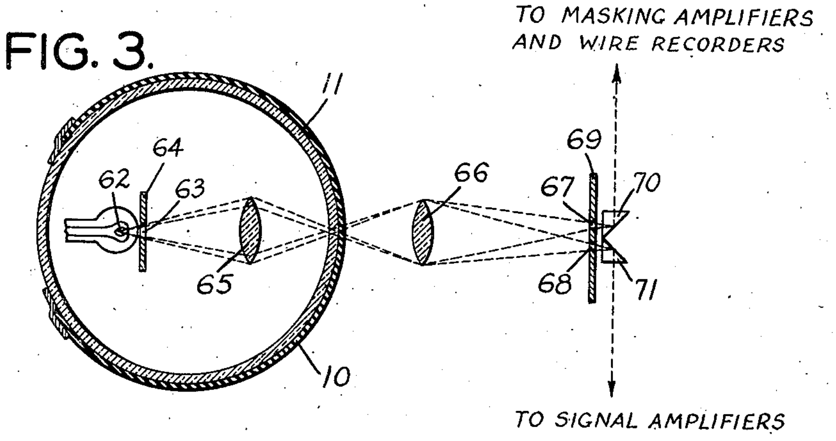
Figure 3 is a schematic diagram of a modified form of scanner constructed according to the invention.

In the modification shown in Figure 3 of the drawings, a somewhat simpler optical system is employed. In this modification, a light source 62 is placed within the scanning drum 11 and directs light through an aperture 63 in an opaque diaphragm 64 to a relatively wide aperture optical system 65, which focuses a relatively wide beam on the film 10. For example, the aperture 63 may be square and its dimensions may be selected to correspond to a scanning aperture .01 by .02 inch.

The beam of light falling upon the transparency 10 may be subsequently enlarged by an appropriate optical system 66 and separated into larger and smaller scanning areas aligned along the scanning direction by the apertures 67 and 67 formed in a diaphragm 69. The two beams may be directed in any suitable manner, as by the prisms 70 and 71, for example, to conventional beam splitter systems as described above in connection with Figure 1.

It will be understood from the foregoing description that the invention provides novel electronic color correction systems for providing an effect equivalent to unsharp masking. By scanning a transparency with scanning apertures of different area, a picture signal and a masking signal can be obtained, which can be combined electronically to produce a signal corresponding to a signal of given color modified by the equivalent of an unsharp mask of another color.

Further, by utilizing a conventional wire or tape recorder with these spaced apart scanning apertures to bring the two scanning signals into phase, any amount of unsharpness found desirable can be used. Since the amount of phase delay is adjustable, it is possible in setting up the apparatus to allow for construction errors. Once the apparatus has been set, however, the proper phase adjustment is always made. Also, the unsharp masking signal is obtained without producing any loss in light intensity in the main signal channel.

It will be further understood that since a relatively larger aperture is employed in the masking channel the band of frequencies which it is required to amplify is much narrower so that the optical requirements for the masking channel are much less severe than those imposed upon the main signal channel.

The several embodiments described in detail above are intended to be merely illustrative of the invention. Numerous changes within the spirit of the invention will become readily apparent to those skilled in the art. For example, although a cylindrical scanning drum has been shown, obviously the invention can be applied to a system employing a flat plate which carries the colored original. The several embodiments shown are susceptible of other modifications in form and detail within the scope of the appended claims.

I claim:

1. In a scanning system, the combination of a subject embodying visual intelligence to be scanned, first means having a scanning aperture of fixed size for scanning elemental areas of said subject to provide first electric signals representative of variations in said intelligence, second means having a scanning aperture of fixed size for scanning said elemental areas of the subject at a position spaced apart along the scanning line from the scanning position of said first scanning means to provide second electric signals representative of variations in said intelligence, and means for modifying values of one of said first and second electric signals as a function of values of the other of said signals derived from scanning essentially the same areas of said subject.

2. In a scanning system, the combination of a subject embodying visual intelligence to be scanned, first means having a scanning aperture of fixed size for scanning said subject to provide first electric signals representative of variations in said intelligence, second means having a scanning aperture of fixed size for scanning said subject at a position spaced apart along the scanning line from the scanning position of said first scanning means to provide second electric signals representative of variations in said intelligence, means for delaying said first electric signals for a sufficient time to bring first and second electric signals corresponding to a predetermined point of said subject substantially in phase, and means for modifying said second electric signals by said delayed first electric signals.

3. In a scanning system, the combination of a subject embodying visual intelligence to be scanned, first means for scanning said subject with an aperture of given size to provide first electric signals representative of variations in said intelligence, second means for scanning said subject with an aperture of different fixed size at a position spaced apart along the scanning line from the scanning position of said first scanning means to provide second electric signals representative of variations in said intelligence, means for delaying said first electric signals for a sufficient time to bring first and second electric signals corresponding to a predetermined point of said subject substantially in phase, and means for modifying said second electric signals by said delayed first signals.

4. In an electronic color correction system, the combination of a subject in color to be scanned, first means for scanning said subject to provide first electric signals representative of variations in a color of said subject, second means for scanning said subject at a position spaced apart along the scanning line from the scanning position of said first scanning means to provide second electric signals representative of variations in a color of said subject, means for delaying said first electric signals, and means for modifying said second electric signals by said delayed first electric signals.

5. In an electronic color correction system, the combination of a subject in color to be scanned, first means for successively scanning areas of given size of said subject along a scanning line to provide first electric signals representative of variations in a color of said subject, second means spaced apart from said first scanning means along said scanning line for successively scanning areas of greater size of said subject to provide second electric signals representative of variations in a color of said subject, means for delaying electric signals produced by the leading scanning means, and means for combining said delayed electric signals and the electric signals produced by the lagging scanning means.

6. In an electronic color correction system, the combination of a subject in color to be scanned, first means for successively scanning areas of given size of said subject along a scanning line to provide first electric signals representative of variations in a color of said subject, second means spaced apart from said first scanning means along said scanning line for successively scanning areas of greater size of said subject to provide second electric signals representative of variations in another color of said subject, means for delaying electric signals produced by the leading scanning means for a sufficient time to bring first and second electric signals corresponding to a predetermined point of said subject substantially in phase, and means for combining said delayed electric signals and the electric signals produced by the lagging scanning means.

7. In an electronic color correction system, the combination of a subject in color to be scanned, first means for scanning said subject with an aperture of relatively small size to provide first electric signals representative of relatively finely detailed variations in a color of said subject, second means for scanning said subject with an aperture of relatively greater size at a position spaced apart along the scanning line from the scanning position of said first scanning means, to provide second electric signals representative of less finely detailed variations in another color of said subject, means for delaying one of said first and second signals for a sufficient time to bring said first and second signals substantially into phase, and means for modifying the undelayed one of said first and second signals by the delayed other of said signals, whereby an output representative of variations in one color of said subject, masked by an unsharp mask of another color is produced.

8. In a method of scanning a subject embodying visual intelligence to be scanned, the steps of scanning areas of said subject with scanning areas of fixed sizes that are spaced apart along the scanning line to provide first electric signals representative of variations in said intelligence and second electric signals representative of variations in said intelligence, respectively, delaying one of said first and second signals to bring said signals in phase, and modifying said first electric signals in accordance with said second electric signals.

9. In a method of scanning a subject embodying visual intelligence to be scanned, the steps of scanning areas of said subject with scanning areas of different fixed sizes that are spaced apart along the scanning line to provide first electric signals representative of relatively finely detailed variations in said intelligence and second electric signals representative of relatively less finely detailed variations in said intelligence, respectively, delaying one of said first and second signals to bring said signals substantially in phase and modifying the undelayed one of said signals in accordance with the other delayed signal.

10. In a method of reproducing a subject in color, the steps of scanning areas of said subject with scanning areas of different sizes that are spaced apart along a scanning line to provide first electric signals representative of relatively finely detailed variations in one color of said subject and second electric signals representative of less finely detailed variations in another color of said subject, delaying one of said first and second electric signals to bring said signals substantially in phase, and modifying the undelayed one of said signals in accordance with the delayed one of said signals to produce an output representative of variations in said one color of the subject masked by an unsharp mask of said another color.

11. In a scanning system, the combination of a subject to be scanned, a source of light, an optical system directing a beam of light of relatively large area from said source to said subject, diaphragm means in the path of light from said beam that has been modified by said subject and having apertures of fixed sizes therein providing a plurality of scanning beams of different sizes spaced apart in the scanning direction, a plurality of photosensitive means disposed to receive said scanning beams and to provide first electric signals corresponding to variations in one of said scanning beams and second electric signals corresponding to variations in another of said scanning beams, and means for modifying one of said first and second electric signals as a function of the other.

12. In an electric color correction system, the combination of a subject in color to be scanned, a source of light, an optical system directing a beam of light of relatively large area from said source to said subject, diaphragm means in the path of light from said subject and having apertures therein providing a plurality of scanning beams of different sizes spaced apart in the scanning direction, a plurality of photosensitive means disposed to receive said scanning beams and to provide first electric signals representative of variations in a color present in one of said scanning beams of given size and second electric signals representative of variations in a color present in another of said scanning beams of larger size, and means for modifying one of said first and second electric signals as a function of the other.

VINCENT C. HALL.

REFERENCES CITED

The following references are of record in the file of this patent:

UNITED STATES PATENTS

| Number | Name | Date |
|---|---|---|
| 1,877,844 | Gerlach | Sept. 20, 1932 |
| 1,901,034 | Karolus | Mar. 14, 1933 |
| 2,165,168 | Hardy | July 4, 1939 |
| 2,185,139 | Wurzhrirg | Dec. 26, 1939 |
| 2,231,669 | Hall | Feb. 11, 1941 |
| 2,253,086 | Murray | Aug. 19, 1941 |
| 2,286,730 | Hall | June 16, 1942 |
| 2,313,542 | Hall | Mar. 9, 1943 |
| 2,313,543 | Hall | Mar. 9, 1943 |
| 2,413,706 | Gunderson | Jan. 7, 1947 |
| 2,415,051 | Thompson | Jan. 28, 1947 |
| 2,423,769 | Goldsmith | July 8, 1947 |